Patented Feb. 2, 1954

2,668,155

UNITED STATES PATENT OFFICE 2,668,155

UREA-FORMALDEHYDE PRIMARY ALKYLENE DIAMINE CONDENSATION PRODUCTS

William Robert McClellan, Kennett Square, Pa., assignor to E. I. du Pont de Nemours and Company, Wilmington, Del., a corporation of Delaware No Drawing. Application April 7, 1950, Serial No. 154,727

14 Claims. (Cl. 260—17.3)

This invention relates to urea-formaldehyde condensation products and, more particularly, to diamine-modified urea-formaldehyde resins having improved properties and to a process of preparing same.

Urea-formaldehyde resins are commercially important thermosetting plastics but the hitherto known resins of this type possess the serious defect of low water resistance. This defect makes them unsuitable for use outdoors or in other applications involving exposure to severe conditions of moisture.

An object of the present invention is to provide urea-formaldehyde condensation products having outstandingly high water resistance and an economical and feasible process of preparing same. A further object is to provide such condensation products having rapid curing rate and good flow characteristics in molding and which give molded products possessing good toughness, high heat distortion temperatures, and excellent resistance to crazing and loss of toughness on exposure outdoors or to heat.

The above objects are accomplished according to the present invention by the formation of a condensation product of reactants essentially consisting of urea, and, per mole of urea, 1.5 to 2.5 moles of formaldehyde, and 0.03 to 0.12 mole of a primary alkylene diamine containing from 4 to 10 carbon atoms, inclusive, and in which the primary amino groups are separated by at least 4 carbon atoms, and an acid catalytically active for the condensation of urea with formaldehyde in an amount stoichiometrically equivalent to 2.5% to 12.5% of the diamine. These new condensation products are prepared by heating at a temperature not exceeding 85° C. in an aqueous medium the above reactants until a clear, homogeneous solution having a pH between 5.0 and 6.5 is obtained. Thereafter the resulting resin may be dried at a temperature below 100° C.

Preferably, the condensation product is formed from reactants essentially consisting of urea and, per mole of urea, 1.6 to 2.0 moles of formaldehyde, and 0.06 to 0.09 mole of hexamethylenediamine, and p-toluenesulfonic acid in an amount stoichiometrically equivalent to 2.5% to 12.5% of the hexamethylenediamine.

A preferred way of carrying out the process of this invention is to heat to about 50° C. an aqueous mixture of urea and formaldehyde, or equivalent amounts of water-soluble monomeric condensation products of urea and formaldehyde, e. g., monomethylolurea, dimethylolurea or higher methylolureas, the mixture containing at least 15% water by combined weight of urea and formaldehyde. The hexamethylenediamine or other diamine is then added to the mixture with agitation and, preferably after the precipitate thereby formed is broken up to eliminate large agglommerates, the p-toluenesulfonic acid, sulfuric acid, or other acid is added and the temperature of the reaction mixture raised to about 65° C.–75° C. Heating is continued at that temperature until a clear solution having a pH between 5.0 and 6.5 is formed.

If desired, all the reactants may be added substantially simultaneously but it is preferred to mix them in the sequence above. The reaction mixture is alkaline at the start, the pH ranging up to as high as 9 to 12 depending upon the amount of diamine present, due to the excess of diamine over acid catalyst, and, as indicated, it contains a precipitate at the start. As the reaction proceeds, the pH of the mixture gradually decreases and the precipitate dissolves due to the reaction of the diamine with the urea-formaldehyde resin. It is essential in order to obtain a resin having the outstanding properties mentioned previously, that the reaction be continued until the mixture is homogeneous and clear and has a pH between 5.0 and 6.5. The resulting solution, which shows no evidence of any appreciable increase in viscosity, may be converted to a molding compound by incorporating in it a quantity of a cellulose filler, e. g., alpha-cellulose, amounting to 20%–50%, preferably 25%–40%, by weight of the finished molding compound, and then drying the mixture at temperatures of 50° C. to 100° C., preferably under reduced pressure. The cellulose filled resin compositions of this invention may be dried at higher temperatures than those (50° C.–55° C.) normally used in drying conventional urea-formaldehyde compositions. The time of drying varies with the temperature and pressure being used, the lower temperatures and higher pressures naturally requiring longer times. At 70° C.–75° C. and pressures of 20–40 mm. of mercury, drying times of 16 to 24 hours are satisfactory. Pressures from atmospheric pressure down may be used but it is not necessary to go below 5–10 mm. of mercury to obtain practical drying rates.

Where the resin is to be converted into a molding compound, it is preferred that its pH shall be in the lower part of the specified range of 5.0–6.5, e. g., about 5.0–5.5 and at least not above a pH of 6.0. Rather than continue heating the reaction mixture until the pH reaches 6.0 or lower, the heating may be terminated when the pH of the reaction mixture enters the top part of the range 5.0–6.5, and further acid may then be added to bring the pH down to 5.5 or so. Molding compounds having better flow characteristics result from the resin having a pH not above 6.0 and it is immaterial whether the pH is adjusted to that level by continued heating of the reaction mixture or adding further acid after the pH has reached 6.5.

The following examples in which proportions are by weight unless otherwise stated, illustrate specific embodiments of the invention.

EXAMPLE I

A mixture of 60 parts of dimethylolurea (containing 15% water), 6.4 parts of urea, 6.5 parts of a 75% aqueous solution of hexamethylenediamine, 125 parts of water, and 0.6 part of p-toluenesulfonic acid, added in the order listed, is heated with stirring to a temperature of 73° C. After being held at this temperature for five minutes, there is obtained a clear solution having a pH of 6.5. To the resin solution thus formed, there are added 3 parts of a 4% aqueous solution of hydrochloric acid which lowers the pH of the solution to 6.0. This solution is then mixed uniformly with 20 parts of alpha-cellulose as a filler and the resulting mixture is dried in a vacuum oven at 70° C. under a pressure of about 25 mm. of mercury for 24 hours. The yield of dry product amounts to 72 parts, of which 20 parts is filler and 50 parts is modified urea-formaldehyde resin containing 9.4% of chemically bound hexamethylenediamine.

In this example there was used, per mole of urea, 1.6 moles of formaldehyde, and 0.08 mole of hexamethylenediamine. The quantity of p-toluenesulfonic acid was stoichiometrically equivalent to 4.0% of the hexamethylenediamine.

The product of Example I exhibits excellent flow characteristics when molded at a temperature of 140° C. under a pressure of 4,000 lb./sq. in. with a molding cycle of 5 minutes. The molded product is translucent and it has excellent toughness and resistance to boiling water. Molded bars of this resin are capable of withstanding more than 8 cycles of alternate immersion for 1 to 2 hours in boiling water followed by drying in air for 24 hours without showing any evidence of crazing or cracking. The molded resin also has a heat distortion temperature, as determined by ASTM method D-648, of 152° C. Molded bars of resins of this type have flexural strengths of about 15,600 lb./sq. in., and after 8 cycles of alternate immersion in boiling water and air drying still have flexural strengths of about 12,500 lb./sq. in.

EXAMPLE II

A mixture of 120 parts of dimethylolurea (containing 15% water), 12.8 parts of urea, 6.5 parts of a 75% aqueous solution of hexamethylenediamine, 250 parts of water, 1.2 parts of p-toluenesulfonic acid, added in the above order, is heated to a temperature of 70° C.–72° C., and held at this temperature for 30 minutes. The resulting clear solution has a pH of 6.0 and is mixed thoroughly with 40 parts of alpha-cellulose and dried at 70° C. under a pressure of 23 mm. of mercury for 24 hours. The resulting dry product amounts to 140 parts.

In this example there was used, per mole of urea, 1.6 moles of formaldehyde, and 0.04 mole of hexamethylenediamine. The quantity of p-toluenesulfonic acid was stoichiometrically equivalent to 4.0% of the hexamethylenediamine.

The product of Example II exhibits good flow when molded under 1,000 lb./sq. in. pressure at 140° C. The molded product has a heat distortion temperature of 144° C. and a flexural strength of 14,000 lb./sq. in. It also has good water resistance, being capable of withstanding more than 8 cycles of alternate immersion in boiling water and drying in air. After 8 such cycles, the test specimen still has a flexural strength of 10,600 lb./sq. in.

EXAMPLE III

A mixture of 48 parts of urea, 104 parts of a 37% aqueous formaldehyde solution, 5.6 parts of tetramethylenediamine, 25 parts of water, and 0.9 part of p-toluenesulfonic acid, added in the above order, is heated with stirring to a temperature of 70° C. and held at this temperature for a period of 45 minutes. The resulting clear solution has a pH of 6.4. This solution is mixed uniformly with 34 parts of alpha-cellulose filler and the mixture is dried in an oven at 70° C. under a pressure of 23 mm. of mercury for 24 hours. There is obtained 110 parts of dry product.

In this example there was used, per mole of urea, 1.6 moles of formaldehyde, and 0.08 mole of tetramethylenediamine. The quantity of p-toluenesulfonic acid was stoichiometrically equivalent to 4.1% of the tetramethylenediamine.

When the product of Example III is molded at 140° C., the composition has excellent flow at 500 lb./sq. in. pressure. The molded article has a heat distortion temperature of 110° C. and a flexural strength of 16,400 lb./sq. in. The molded product does not show failure after 5 cycles of alternate immersion in boiling water and air drying.

EXAMPLE IV

The process of Example III is repeated with the exception that the tetramethylenediamine of that example is replaced by 9.2 parts of decamethylenediamine and the reaction mixture is heated at 76° C. instead of 70° C. Under these conditions there is obtained in 15 minutes a clear solution having a pH of 5.8. This solution is mixed with alpha-cellulose filler and dried as described in Example III. The resulting dried product amounts to 112 parts.

In this example there was used, per mole of urea, 1.6 moles of formaldehyde, and 0.067 mole of decamethylenediamine. The quantity of p-toluenesulfonic acid was stoichiometrically equivalent to 4.9% of the decamethylenediamine.

When the product of Example IV is molded at 140° C., the composition has excellent flow at a pressure of 2,000 lb./sq. in. The molded article has a heat distortion temperature of 124° C., a flexural strength of 14,000 lb./sq. in., and is capable of withstanding more than 8 cycles of alternate immersion in boiling water and air drying.

EXAMPLE V

A mixture of 48 parts of urea, 103 parts of aqueous 37% formaldehyde and 9.3 parts of 2,5-dimethyl-1,6-hexanediamine, and 0.9 part of p-toluenesulfonic acid, added in the above order, is heated with stirring to a temperature of 74° C. and held at this temperature for 90 minutes. The resulting solution is clear and homogeneous and has a pH of 6.5. This solution is uniformly mixed with 34 parts of alpha-cellulose filler and the mixture is dried at 70° C. under a pressure of 23 mm. of mercury for 24 hours. The dried product obtained amounts to 107 parts.

In this example there was used, per mole of urea, 1.6 moles of formaldehyde and 0.08 mole of 2,5-dimethyl-1,6-hexanediamine. The quantity of p-toluenesulfonic acid was stoichiometrically equivalent to 4.05% of the 2,5-dimethyl-1,6-hexanediamine.

When the product of Example V is molded at 140° C., the composition has excellent flow under a pressure of 2,000 lb./sq. in. The molded article has a heat distortion temperature of 117° C. and is capable of withstanding more than 8 cycles of alternate immersion in boiling water and air drying.

EXAMPLE VI

This example illustrates the preparation of a resin having a ratio of 1.75 moles of formaldehyde per mole of urea and 0.10 mole of hexamethylenediamine per mole of urea, in the presence of an amount of p-toluenesulfonic acid corresponding to 5% of the diamine equivalent. Nine hundred parts of urea (15 moles) and 2130 parts of 37% aqueous formaldehyde (26.25 moles) are mixed together. The solution is then heated to 50° C. and 232.5 parts of a 75% aqueous solution of hexamethylenediamine (1.5 moles) added while agitating vigorously with a mechanical stirrer to break up the precipitate which forms. A solution of 28.5 parts of p-toluensesulfonic acid (0.15 mole) in 25 parts of water is added to the solution, which is then heated to 70° C.–75° C. After 15–30 minutes the precipitate dissolves giving a clear solution. Heating is continued until the pH of the solution reaches 6.0 to 6.5, a period of about 75 minutes after the addition of the acid catalyst being required. The resulting solution is cooled to 30° C.–40° C. and adjusted to a pH of 5.5 by the addition of dilute sulfuric acid and poured over 750 parts of alpha-cellulose. The resin solution and cellulose filler are thoroughly mixed and then dried in a tray in a vacuum oven at 70° C.–75° C. for 16–20 hours. The final product amounts to 2316 parts.

A portion of the cellulose-filled resin prepared above is ground in a ball mill to a fine powder and then compression molded at 2000–3000 lb./sq. in. at 140° C.–150° C. for 4–5 minutes into test bars. These bars have the following properties: heat distortion temperature (264 lb./sq. in.) 133° C., 145° C., Izod impact strength 0.31 lb./inch of notch, a flexural strength of 15,200 lb./sq. in., and are capable of withstanding more than 22 cycles of alternate immersion in boiling water and drying in air. Test bars submitted to 22 such cycles of boiling and drying still have a flexural strength of 14,900 lb./sq. in., this corresponding to 98% retention of flexural strength.

A mixture of 895 parts of the resin solution prepared above, 4.5 parts of zinc stearate and 35.8 parts of titanium dioxide pigment are milled in a two roll mill to form a hard sheet. This sheet is broken up and ground to pass a ¼" screen. The granular product obtained has a bulk density of 0.68 g./cc. and when molded in an impact bar mold forms excellent bars at 500 lb./sq. in. pressure at 140° C. for 5 minutes. The resulting bars have a heat distortion temperature of 133° C. The granular resin also has excellent flow and gives good moldings in an ASTM mobility cup mold.

It will be understood that the above examples are merely illustrative and that the present invention broadly comprises a condensation product of reactants essentially consisting of urea, and, per mole of urea, 1.5 to 2.5 moles of formaldehyde, and 0.03 to 0.12 mole of a primary alkylene diamine containing from 4 to 10 carbon atoms, inclusive, and in which diamine the primary amino groups are separated by at least four carbon atoms, and an acid catalytically active for the condensation of urea with formaldehyde in an amount stoichiometrically equivalent to 2.5% to 12.5% of the diamine.

While the examples illustrate the invention by the use of certain specific diamines as the modifying agent, any primary alkylene diamine having from 4 to 10 carbon atoms, inclusive, with at least 4 carbon atoms separating the amino groups may be used. Among the other alkylene diamines suitable for use in the present invention are pentamethylenediamine, heptamethylenediamine, octamethylenediamine, 3-methyl-1,6-hexanediamine, nonamethylenediamine, and 5-methyl-1,9-nonanediamine. Since the most desirable combination of properties of the resulting diamine-modified urea-formaldehyde resins are obtained with hexamethylenediamine, this particular diamine is especially preferred. The chain length of the alkylene diamines is a critical factor in obtaining the improved resins of this invention. Alkylene diamines having more than 10 carbon atoms are not suitable for use in preparing the modified urea-formaldehyde resins. Diamines having less than 4 carbon atoms give products having greatly inferior properties. In particular, if ethylenediamine is substituted for an alkylene diamine having from 4 to 10 carbon atoms in the process of this invention, products lacking in water resistance and having low heat distortion temperatures and toughness (flexural strength) are obtained. More specifically, a resin prepared from urea and formaldehyde in the proportions of 1.6 mole of formaldehyde to 1 mole of urea, 0.08 mole of ethylenediamine per mole of urea and p-toluenesulfonic acid (in an amount stoichiometrically equivalent to 5% of the ethylenediamine) as catalyst by heating at 70° C. until a clear solution having a pH of 6.5 is obtained and then mixed with 23 parts of alpha-cellulose filler, dried at 70° C. and molded at 140° C. under 500 lb./sq. in., has the following properties: Heat distortion temperature, 83° C.; crazing and deterioration pronounced after only one cycle of alternate immersion in boiling water and air drying.

The proportion of the primary alkylene diamine used is also a critical factor in producing the improved resins of this invention. An amount of such diamine less than 0.03 mole per mole of urea gives a product having poor flow during molding and the molded articles do not possess the desired high water resistance. An amount greater than 0.12 mole of diamine per mole of urea gives products which are inferior in their heat distortion temperatures, stiffness and water resistance. Products having the optimum combination of properties are obtained when proportions of alkylene diamine ranging from 0.06 to 0.09 mole of diamine per mole of urea are employed.

The specific acid, p-toluenesulfonic, acid mentioned in the examples is the preferred catalyst for use in the process of this invention since it produces resins having the best combination of properties although sulfuric acid is likewise highly suitable. However, other organic or inorganic acids can be used if desired. Examples of other catalytically active acids which produce products having properties superior to conventional urea-formaldehyde resins, include glycolic and phthalic acids. Still other acids which are catalytically active include oxalic, phosphoric, and citric acids. Although the effectiveness of these acids as catalysts is not directly proportional to their dissociation constants, the acids which are catalytically active in general have dissociation constants greater than $1.0 \times 10^{-4}$ at 25° C.

The acids effective in this process must be used in the proportions specified, i. e., from 2.5% to 12.5% of the amount stoichiometrically equivalent to the diamine present. With this proportion of acid the reaction mixture is initially alkaline, the pH usually being from about 9 to about 12 at the beginning of the reaction, and as the condensation proceeds the pH decreases. The condensation must be continued until a pH between 5.0 and 6.5 is reached. It is essential that the pH of the final reaction mixture be within these limits to produce resins having the superior properties mentioned previously. As indicated before, it is permissible to heat the reaction mixture only until the pH thereof enters the pH range of 5.0–6.5 and, in order to obtain a pH in the lower part of the range, to add further acid rather than prolong the heating. This is a preferred expedient where the resin is to be converted to a molding compound since a resin having a relatively low pH of 5.0 to 5.5 is usually more desirable for such use.

If an amount of acid catalyst substantially more than 12.5% of the diamine equivalent is employed in the process of this invention or if the condensation is continued to a pH below 5.0, the resulting resins have poor flow characteristics on molding, and the molded articles have poor water resistance. If less than 2.5% of acid is used or if too weak an acid is used, the reaction mixture cannot be brought to a pH of less than 6.5 and as a result the product also has inferior properties, e. g., poor curing on molding and the molded article has inferior toughness, water resistance and heat distortion temperature.

The urea and formaldehyde are reacted in the ratio of 1.5 to 2.5 moles of formaldehyde per mole of urea. Within this range more specific ranges may be somewhat preferable in producing a resin designed for a particular use. In the preparation of a resin to be converted to a molding compound, by way of illustration, it is preferred but not necessary to use 1.6 to 2.0 moles of formaldehyde per mole of urea. It is not essential to use urea and formaldehyde as distinguished from equivalent amounts of water-soluble monomeric condensation products of urea and formaldehyde, e. g., methylolurea, dimethylolurea, or higher methylolureas, provided that the essential proportion range of urea and formaldehyde is observed.

The temperature at which the reaction may be carried out can be varied over a considerable range. It is not advisable to exceed 85° C. appreciably while, at the other extreme, temperatures below 35° C. are not practical as the reaction proceeds too slowly. It is preferred to use a temperature in the upper part of this range and reaction temperatures of 65° C. to 75° C. are especially favorable.

The proportion of water present in the reaction mixture is not sharply critical although the use of less than 15% by weight of the combined urea and formaldehyde is not desirable. Excellent results have been obtained with 20% to 25% water by weight of the combined urea and formaldehyde but higher proportions of water are entirely operative and simply involve the handling of greater amounts of water than there is any real need to use.

In addition to alpha-cellulose, the diamine-modified urea-formaldehyde resins of this invention can be filled with other materials in a wide range of proportions. Examples of other suitable fillers include other types of cellulose such as wood flour, asbestos, and other types of resins. However, cellulosic fillers are preferred since this type of filler gives the best molding characteristics and the molded products possess an excellent combination of properties. Amounts of cellulosic fillers ranging from 25% to 40% of the total composition give exceptionally good results.

The urea-formaldehyde resins of this invention may, if desired, be colored by conventional pigments. Similarly, other conventional resin modifiers may be incorporated with the urea-formaldehyde resins of this invention. A specific example of such modifiers is a mold lubricant such as zinc stearate.

The excellent combination of properties possessed by the resins of this invention makes them very suitable for use in all applications for which thermosetting resins are required. The outstanding water, heat and light resistance of the resins of this invention makes them especially useful in those applications where the resins must be subjected to relatively moist conditions or to exposure out of doors.

The condensation products of this invention containing formaldehyde and urea in the molar ratio of 1.6–2.0 to 1 and containing a cellulosic filler are especially valuable as molding compositions. These products cure rapidly, molding cycles of 4 to 5 minutes generally being sufficient at 140° C. Molding temperatures of 125° C.–160° C. can be used, although the temperatures of 140° C.–150° C. are preferred. When a conventional molding catalyst such as glycolic acid is added to the dry molding composition, a cycle of only 2 minutes at 140° C. is sufficient for complete curing. The flow characteristics of these molding compositions are in general superior to those of commercially available urea-formaldehyde molding compositions and the molding pressures required are generally lower. For example, pressures as low as 500 lb./sq. in. are satisfactory for some of the compositions of this invention, whereas pressures of 1,000–3,000 lb./sq. in. are generally required for the commercial resins. The toughness of the molded resins of this invention is somewhat greater than that of commercial thermosetting resins, including the urea-formaldehyde, melamine-formaldehyde and phenol-formaldehyde resins.

The resins of this invention are particularly outstanding in their water resistance. This is demonstrated by comparison of the results obtained in tests of the resins of this invention and corresponding tests of commercially available resins of different types. The cellulose-filled resins of this invention are capable of withstanding more than 20 cycles of alternate immersion in boiling water and air drying without showing any evidence of crazing or cracking. Furthermore, the cellulose-filled resins of this invention retain from 70% to 98% of their flexural strength after being subjected to from 8 to 22 such cycles. On the other hand, conventional urea-formaldehyde resins show excess crazing and cracking after 1 to 4 such cycles, and the test specimens in most cases are too weak to test for flexural strength after such exposure. Even the commercial melamine-filled resins, which are known to be more water resistant than urea-formaldehyde resins, generally show slight crazing and cracking after 3 to 4 cycles of alternate immersion in boiling water and air drying. Further, the melamine resins subjected to 5 to 8 cycles of this type retain only 40% to 60% of their original flexural strength. Similar advantages are exhibited by the diamine-modified urea-formaldehyde resins of this invention in accelerated weathering tests, outdoor exposure, and heat treatment tests. The following Table I summarizes the results of certain comparative tests of the resins of this invention and several commercially available resins.

ties of paper, textiles, and other forms of cellulose.

By way of illustration, a resin suitable for applying to paper pulp in the beater prior to formation of the paper sheet in order to form paper having high wet strength, is prepared as follows: To a hexamethylenediamine-modified urea-formaldehyde resin made by the process defined previously containing 2.0 moles of formaldehyde per mole of urea, 0.04 mole of diamine per mole of urea and heated at 70° C. in the presence of 5% p-toluenesulfonic acid catalyst until a pH of 6.5 has been reached, is added another 0.04 mole, per mole of urea, of hexamethylenediamine in the form of its monosalt of acetic acid. The resin is then heated at 70° C. until the pH reaches 5.0–5.5, about 15 minutes being required. The resulting aqueous resin solution is concentrated by evaporation to a solids content of 95–100%. Three parts of this resin is added to 100 parts of paper pulp dispersed in water in a beater, and, after beating until the resin is uniformly distributed,

*Table I*

| Molded Product | Conditions of Molding | Flexural Strength, lb./sq. in. | Water Resistance | |
|---|---|---|---|---|
| | Pressure/ Temp./Time, lb./sq. in./° C./ min. | | Cycles Withstood [1] | Flexural Strength,[2] lb./sq. in. |
| Products of Examples: | | | | |
| I | 4,000/140/5 | 15,600 | 8+ | 12,500. |
| II | 1,000/140/5 | 14,000 | 8+ | 10,600. |
| VI | 2,000/140/5 | 15,200 | 22+ | 14,900. |
| Commercial Urea-Formaldehyde Resin. | 3,000/140/5 | 12,300 | 1 (Slight crazing) 2 (Excessive crazing) | less than 500. |
| Commercial Melamine-Formaldehyde Resin. | 1,000/140/5 | 14,000 | 2 (Slight crazing) | 7,300 after 5 cycles. |

[1] One cycle consists of 1–2 hours immersion in boiling water followed by air drying for 24 hours. The number of cycles noted indicates the number of such cycles withstood without showing any evidence of cracking or crazing.

[2] Flexural strength determined on molded bar after it had been subject to the number of cycles of alternate wetting and drying indicated in the column to the left.

The condensation products of this invention are particularly valuable for many uses other than as molding compositions. Either in the presence or absence of fillers, they are useful as bonding agents, textile modifying agents, adhesives, baking enamels, and the like. For these uses resins having the higher ratios of formaldehyde to urea, e. g., 2.0–2.5 moles of formaldehyde per mole of urea, are generally preferred.

These resins are capable of producing high wet strength paper by spraying the resin solution of pH 5.0 to 6.5 on to paper and then drying the treated paper. The resins are also useful as binders for non-woven fabrics and in making surface laminates of impregnated paper.

In some instances where the water-resistant resins of this invention are to be applied to cellulosic material to improve the water resistance of such material, especially where the resin is to be added to paper pulp in the beater prior to formation of the paper sheet, it is advantageous to introduce ionically charged groups into the resin in order to increase the affinity of the resin for cellulose. This can be done by heating the final resin solution prepared in accordance with this invention with a relatively small proportion of a polyamino compound, especially a primary alkylene diamine of the type used in forming the resin, alone or in the form of a partial or complete salt of an acid until the pH of the resin reaches 5.0 to 5.5. Such modified resins are substantive to cellulose and are useful in modifying the properties of paper, textiles, and other forms of cellulose.

the pulp is formed into sheets of paper which are then dried. The resulting paper has a wet bursting strength of 50–60% of its dry bursting strength.

As many apparently widely different embodiments of this invention may be made without departing from the spirit and scope thereof, it is to be understood that the invention is not limited to the specific embodiments thereof except as defined in the appended claims.

The invention claimed is:

1. A condensation product obtained by heating in aqueous medium at less than about 85° C. until a clear solution having a pH between 5.0 and 6.5 is formed, urea, and per mole of urea, 1.5 to 2.5 moles of formaldehyde, and 0.03 to 0.12 mole of a primary alkylene diamine containing from 4 to 10 carbon atoms, inclusive, and in which the primary amino groups are separated by at least 4 carbon atoms, and an acid catalytically active for the condensation of urea with formaldehyde in an amount stoichiometrically equivalent to 2.5% to 12.5% of said diamine, the proportion and character of said acid being such that the pH of said aqueous medium is lowered to at least 6.5 upon heating.

2. Product as set forth in claim 1 wherein said primary alkylene diamine is hexamethylenediamine.

3. Product as set forth in claim 2 wherein said acid is p-toluenesulfonic acid.

4. A condensation product obtained by heating in aqueous medium at less than about 85° C. until a clear solution having a pH between 5.0 and 6.5 is formed, urea, and per mole of urea, 1.6 to 2.0 moles of formaldehyde, and 0.06 to 0.09 mole of a primary alkylene diamine containing from 4 to 10 carbon atoms, inclusive, and in which the primary amino groups are separated by at least 4 carbon atoms, and an acid catalytically active for the condensation of urea with formaldehyde in an amount stoichiometrically equivalent to 2.5% to 12.5% of said diamine, the proportion and character of said acid being such that the pH of said aqueous medium is lowered to at least 6.5 upon heating.

5. Product as set forth in claim 4 wherein said primary alkylene diamine is hexamethylenediamine.

6. Product as set forth in claim 5 wherein said acid is p-toluenesulfonic acid.

7. A molding compound comprising the condensation product set forth in claim 1 intimately admixed with 20% to 50%, by weight of said molding compound, of a cellulosic filler.

8. A molding compound comprising the condensation product set forth in claim 4 intimately admixed with 25% to 40%, by weight of said molding compound, of alpha-cellulose.

9. Process of preparing a condensation product which comprises heating at less than about 85° C. in an aqueous medium urea, and per mole of urea, 1.5 to 2.5 moles of formaldehyde, and 0.03 to 0.12 mole of a primary alkylene diamine containing from 4 to 10 carbon atoms, inclusive, and in which the primary amino groups are separated by at least 4 carbon atoms, and an acid catalytically active for the condensation of urea with formaldehyde in an amount stoichiometrically equivalent to 2.5% to 12.5% of said diamine, until a clear solution having a pH between 5.0 and 6.5 is formed, the proportion and character of said acid being such that the pH of said aqueous medium is lowered to at least 6.5 upon heating.

10. Process as set forth in claim 9 wherein said primary alkylene diamine is hexamethylenediamine.

11. Process as set forth in claim 10 wherein said acid is p-toluenesulfonic acid.

12. Process of preparing a condensation product comprising mixing urea and formaldehyde in a ratio of 1.6 to 2.0 moles of formaldehyde per mole of urea in a quantity of water amounting to at least 15% by combined weight of the urea and formaldehyde, adding thereto 0.06 to 0.09 mole of a primary alkylene diamine containing from 4 to 10 carbon atoms, inclusive, and in which the primary amino groups are separated by at least 4 carbon atoms, and then adding thereto an acid catalytically active for the condensation of urea with formaldehyde in an amount stoichiometrically equivalent to 2.5% to 12.5% of said diamine, and heating said mixture at about 65° C. to 75° C. until a clear solution having a pH between 5.0 and 6.5 is formed, the proportion and character of said acid being such that the pH of said mixture is lowered to at least 6.5 upon heating.

13. Process as set forth in claim 12 wherein said primary alkylene diamine is hexamethylenediamine.

14. Process as set forth in claim 13 wherein said acid is p-toluenesulfonic acid.

WILLIAM ROBERT McCLELLAN.

References Cited in the file of this patent

UNITED STATES PATENTS

| Number | Name | Date |
| --- | --- | --- |
| 2,334,545 | D'Alelio | Nov. 16, 1943 |
| 2,354,671 | Eastes | Aug. 1, 1944 |
| 2,371,997 | Hoover | Mar. 20, 1945 |
| 2,485,485 | Dudley | Oct. 18, 1949 |

FOREIGN PATENTS

| Number | Country | Date |
| --- | --- | --- |
| 572,245 | Great Britain | Sept. 28, 1945 |